United States Patent
Juhlin

(10) Patent No.: US 6,570,384 B1
(45) Date of Patent: May 27, 2003

(54) LOCATION OF A CABLE IN A DC CONNECTION IN A BIPOLAR 12-PULSE SYSTEM FOR TRANSMISSION OF ELECTRICAL ENERGY BY MEANS OF HIGH-VOLTAGE DIRECT CURRENT

(75) Inventor: Lars-Erik Juhlin, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/868,334

(22) PCT Filed: Nov. 22, 1999

(86) PCT No.: PCT/SE99/02140
§ 371 (c)(1),
(2), (4) Date: Oct. 4, 2001

(87) PCT Pub. No.: WO00/41007
PCT Pub. Date: Jul. 13, 2000

(30) Foreign Application Priority Data

Dec. 18, 1998 (SE) .............................. 9804403

(51) Int. Cl.⁷ .......................... G01V 3/08; G01V 3/165; G01R 19/00
(52) U.S. Cl. ............................. 324/326; 324/67; 363/35
(58) Field of Search .................. 324/326, 327, 324/67, 328, 247; 363/35

(56) References Cited

U.S. PATENT DOCUMENTS

| | | | | |
|---|---|---|---|---|
| 4,165,482 A | * | 8/1979 | Gale ........................ | 324/523 |
| 4,220,911 A | * | 9/1980 | Rosa ........................ | 323/258 |
| 4,438,389 A | * | 3/1984 | De Sa ....................... | 324/326 |
| 4,438,401 A | * | 3/1984 | Iwamoto et al. ............ | 324/247 |
| 4,625,172 A | * | 11/1986 | Yamamura et al. ......... | 324/127 |
| 4,939,486 A | * | 7/1990 | Bergdahl et al. ............ | 307/105 |
| 5,414,612 A | * | 5/1995 | Bjorklund et al. ........... | 363/35 |
| 5,438,266 A | * | 8/1995 | Tsang ........................ | 324/326 |
| 5,751,563 A | * | 5/1998 | Bjorklund ................... | 363/35 |
| 5,764,061 A | * | 6/1998 | Asakawa et al. ........... | 324/247 |
| 6,002,258 A | * | 12/1999 | Mercer ....................... | 324/326 |

FOREIGN PATENT DOCUMENTS

| | | |
|---|---|---|
| GB | 2 137 359 | 10/1984 |

OTHER PUBLICATIONS

Arrilaga et al., "The Frequency Dependent Impedance of an HVDC Converter," IEEE Transactions on Power Delivery, vol. 10, No. 3, Jul. 1995 pp. 1635–1641.*
Takada et al. "DC Cable Sensors for Locating Underwater Telecommunication Cables," KDD R&D Laboratories, Aug. 1996, pp. 339–344.*
Patent Abstracts of Japan, JP 57 206877, Dec. 18, 1982.
Patent Abstracts of Japan, JP 7 240704, Sep. 12, 1995.

* cited by examiner

*Primary Examiner*—Edward Lefkowitz
*Assistant Examiner*—Darrell Kinder
(74) *Attorney, Agent, or Firm*—Oblon, Spivak, McClelland, Maier & Neustadt, P.C.

(57) ABSTRACT

A dc connection (CAB1, CAB2) in a bipolar 12-pulse system for transmission of electrical energy by means of high-voltage direct current interconnects two converters, each one having two 6-pulse valve bridges (BR11, BR12, BR21, BR22) connected in series at a connection point (J1, J2). In a method for location of the cable, said cable is located by sensing of a magnetic field associated with a current flowing through the cable. The dc connection is temporarily supplied with a ground-mode current, intended for the location, and a magnetic field associated with said ground-mode current is sensed.

18 Claims, 5 Drawing Sheets

LOCATION OF A CABLE IN A DC CONNECTION IN A BIPOLAR 12-PULSE SYSTEM FOR TRANSMISSION OF ELECTRICAL ENERGY BY MEANS OF HIGH-VOLTAGE DIRECT CURRENT

TECHNICAL FIELD

The present invention relates to a method for location of a cable in a dc connection in a bipolar 12-pulse system for transmission of electrical energy by means of high-voltage direct current, whereby the cable is located by sensing a magnetic field associated with a current flowing through the cable, and a device for carrying out the method.

BACKGROUND ART

A system for transmission of electrical energy by means of high-voltage direct current (HVDC) comprises two line-commutated converters, each one via a separate converter transformer connected to a separate three-phase ac network. Each one of the converters comprises two 6-pulse valve bridges, mutually series-connected at a connection point, each valve bridge being connected to a respective ac network via a respective secondary winding on the converter transformer. This is adapted such that the voltages from the respective secondary winding exhibits a mutual phase shift of 30 electrical degrees such that the two valve bridges of the converter in a known manner form a 12-pulse unit.

Via their dc voltage terminals, the converters are connected to each other by means of a dc connection with two dc conductors such that the transmission system will form a bipolar 12-pulse system.

For a general description of HVDC systems, reference is made to Åke Ekström: High Power Electronics HVDC and SVC. Stockholm 1990, inparticular pages 3–10 to 3–11 with FIGS. 3–11, and pages 7–1 to 7–4 and pages 7–8 to 7–13 with FIGS. 7–2.

The dc conductors may, at least in part, be made in the form of cables. When the energy is to be transmitted over a region with water, most often a sea region, the cables are usually buried beneath the sea bed to protect them from, for example, trawls from fishing boats and from anchors lowered from ships.

For location of the position of the cables during the burial stage, an electric current is fed through the cable where the position of the cable is determined in a known manner by means of magnetic sensors which sense the magnetic field generated by the current. Since, particularly in shallower waters, the sea bed may be subjected to movements, for example because of storms, it is also necessary, after a certain time of operation of the energy transmission, to check, at recurrent intervals, the position and depth of trench of the cables below the sea bed.

In those cases where the cables are laid close to each other on the sea bed or are arranged in the form of a common double cable, however, a circulating current in the dc connection, fed in via the converters, does not give rise to a reliably detectable external magnetic field. To carry out a check of the position of the cable, that part of the dc connection which consists of cable may, for example, be disconnected from the other parts of the dc connection and a current be supplied to either of the cables by means of an external current source. However, this implies relatively extensive work and during the time needed for this work and for restoration of the dc connection, the transmission system is not available for transmission of electrical energy.

SUMMARY OF THE INVENTION

The object of the invention is to achieve an improved method of the kind described in the introduction, which permits a location of the position of the cable while the transmission system is in normal operation, whereby the above-mentioned disadvantages concerning the availability of the transmission system for transmission of electrical energy can be avoided, and a device for carrying out the method.

According to the invention, this object is achieved by temporarily supplying to the dc connection a ground-mode current intended for the location, and by sensing a magnetic field associated with this ground-mode current.

According to an advantageous improvement of the invention, one of the connection points is connected to ground via an impedance circuit with an impedance, capable of being influenced, of a substantially inductive nature, whereby the ground-mode current is supplied to the dc connection by the inductance of the impedance circuit being temporarily reduced.

According to another advantageous improvement of the invention, the device comprises a current source connected between one of the connection points and ground.

According to still another advantageous improvement of the invention, the ground-mode current is supplied to the dc connection by bringing at least one of the converters to generate a ground-mode current.

Further improvements of the invention will become clear from the following description and claims.

BRIEF DESCRIPTION OF THE DRAWINGS

The invention will be explained in greater detail by description of embodiments with reference to the accompanying drawings, which are all schematic and in the form of single-line diagrams and block diagrams, respectively, and wherein.

DESCRIPTION OF THE PREFERRED EMBODIMENTS

The following description relates to the method as well as to the device.

The block diagrams may thus be regarded both as signal-flow diagrams and block diagrams of a device. The functions performed by the blocks shown in the block diagrams may, in applicable parts, be performed by means of analog and/or digital technique, or as computer programs in a microprocessor. Thus, where appropriate, the expression "signal" may also be understood as a value formed in a computer program and occurring as such only.

Further, it is to be understood that, although the blocks shown in the figures are mentioned as units, members, etc., these are to be understood as means for achieving the desired function, especially in those cases where their functions are implemented as software in, for example, microprocessors.

Figure 1:
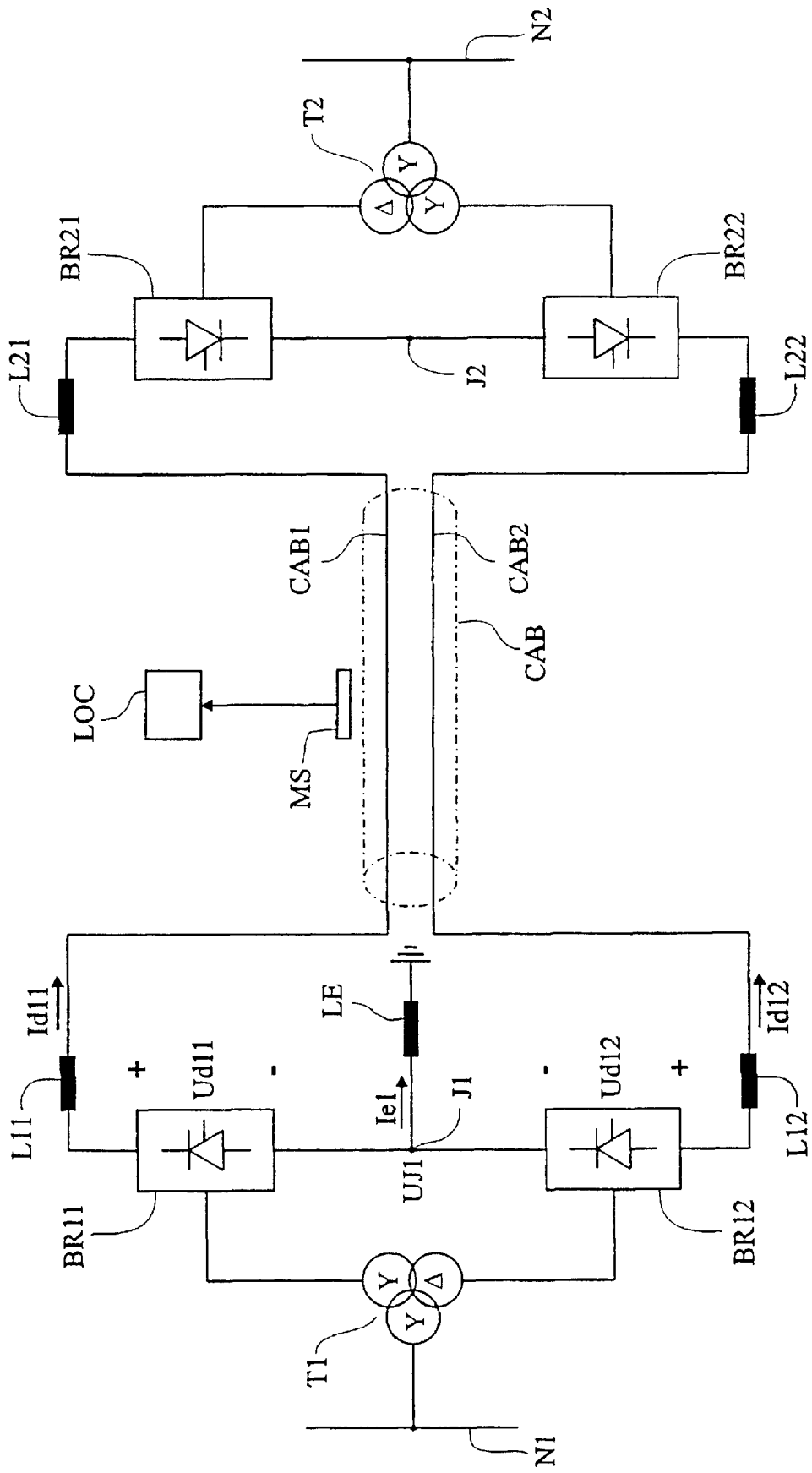
FIG. 1 shows a known design of a bipolar 12-pulse system for transmission of electrical energy by means of high-voltage direct current.

FIG. 1 shows a known embodiment of a bipolar 12-pulse system for transmission of electrical energy by means of high-voltage direct current. A first converter with two six-pulse valve bridges BR11 and BR12, respectively, is connected to a three-phase electric ac network N1 via a converter transformer T1. This comprises two secondary windings, which are adapted such that the voltages from the respective secondary winding exhibit a mutual phase shift of 30 electrical degrees, for example, as indicated in the figure, by the secondary winding for feeding the bridge BR11 being star-connected whereas the secondary winding for feeding the bridge BR12 is delta-connected. The valve bridges are series-connected, from a dc voltage point of view, in that they are connected to a common connection point J1 such that the converter in a known manner forms a 12-pulse unit.

A second converter with two six-pulse valve bridges BR21 and BR22, respectively, is connected to a three-phase electric ac network N2 via a converter station T2 of the same kind as the converter transformer T1. From the dc voltage point of view, the valve bridges BR21 and BR22 are series-connected in that they are connected to a common connection point J2.

A dc connection between the converters described comprises two cables CAB1 and CAB2, which are connected to the first converter via smoothing inductors L11 and L12 and to the second converter via smoothing inductors L21 and L22. The cables CAB1 and CAB2 are each separately insulated and arranged in a double cable CAB with a common external screening and reinforcement. In addition thereto, the dc connection may, depending on local conditions, comprise parts which are designed as cables and/or overhead lines. In this embodiment, the double cable is assumed to be laid under a sea bed, usually of the order of magnitude, of 0.5–1 m under the sea bed.

The valve bridges BR11 and BR12 are controlled in a known manner in dependence on common control equipment (not shown in the figure) and generate dc voltages Ud11 and Ud12, respectively, in dependence on a common control angle order α generated by the control equipment. The bridge BR11 supplies a current Id11 to the cable CAB1 and the bridge BR12 supplies a current Id12 to the cable CAB2.

The connection point J1 is connected via an inductor LE to a ground terminal, symbolically shown in the figure, for the purpose of obtaining a good connection to ground of the dc connection, from the dc voltage point of view. The ac network N1 is assumed to have a nominal mains frequency F, which is usually equal to 50 or 60 Hz. When the valve bridges BR11 and BR12 are connected to the ac network, a voltage, which contains a component of a frequency equal to six times the nominal main frequency, occurs at the connection point. This voltage component generates a current Ie1 flowing through the inductor LE. The dc connection interconnects two converters via the cables CAB1 and CAB2, which converters, as mentioned above, form a 12-pulse unit each. The transmission system is thus advantageous in those cases where it is desirable to transmit the electrical energy via the above-mentioned cables only whereas a direct current through ground is not accepted. The inductor LE must thus limit the amplitude of the current Ie1 such that the converters, from a practical point of view, behave as 12-pulse units. Unbalance in the direct current is suitably avoided by connecting only one of the converters, from the point of view of dc voltage, to ground via an inductor.

To describe the invention, it is assumed in the following that the inductor LE has an inductance which limits the amplitude of the current Ie1 to a level which is negligible for this purpose (but hence also to a level which does not permit location of the double cable by sensing the magnetic field associated with the deviation in amplitude, depending on the current Ie1, between the current through the cable CAB1 and the current through the cable CAB2).

Location of cables under the sea bed under the circumstances described in the introductory part of the description is performed, in a manner known per se, by conducting a current through the cable and moving magnetic sensor equipment MS to the area where the cable is assumed to be located. The sensor equipment is connected to locating equipment LOC, which usually, at least in part, is placed onboard a ship. The sensor equipment supplies to the locating equipment measured values of the magnetic field associated with the current, and by evaluation of these values while moving the sensor equipment, the position of the cable, including its depth of trench, can be located.

In the case described here, where the cables CAB1 and CAB2 are arranged in a double cable CAB, the magnetic fields from the cable CAB1 and from the cable CAB2, which are associated with a current circulating through the dc connection, counteract each other. The resultant magnetic field occurring outside the double cable thus becomes very weak also in the vicinity of the cable.

According to the invention, the dc connection is temporarily supplied with a ground-mode current intended for the location. The occurrence of a ground-mode current implies that the sum of the currents in the cables CAB1 and CAB2, with directions defined as in FIG. 1, is different from zero, that is, the current through the cable CAB2 does not balance the current through the cable CAB1. This results in a magnetic field around the double cable which may be utilized for location thereof by means of the sensor equipment MS. The amplitude of a ground-mode current which leads to a deviation between the currents through the cables CAB1 and CAB2, which deviation is appropriate for practical purposes and detectable with the sensor equipment, may be calculated in advance, in a manner well-known to the person skilled in the art, with knowledge of data for the cables, of the soil/sand layer in which the double cable is buried and other conditions of burial, such as the depth of trench under the sea bed, for the double cable.

Since the ground-mode current, supplied according to the invention, is an alternating current, the reference directions for current and voltage indicated in FIG. 1 are preferred in the following, which thus imply that, during normal operation, the current Ld12 and the voltage Ud12 assume negative values. By definition, the following then applies to the ground-mode current Ig and the pole-mode current Ip: Ig=(Id11+Id12)/2 and Ip=(Id11−Id12)/2. Inversely, the current Id11 in cable CAB1 and the current Id12 in cable CAB2, respectively, are then obtained as Id11 Ig=Ip and Id12=Ig−Ip.

In similar manner, for a ground-mode voltage Ug and a pole-mode voltage Up the following definitions apply: Ug=(Ud11+Ud12)/2+UJ1 and Up=(Ud11−Ud12)/2, where the voltage UJ1 is the voltage between the connection point J1 and ground. Inversely, the voltage Ud11 across the bridge BR11 and the voltage Ud12 across the bridge BR12, respectively, are obtained as Ud11=Ug+Up=UJ and Ud12=Ug−Up−UJ1.

From the above definitions follows that, for the current Ie1 from the connection point J1 to ground, the following applies: Ie1=−2Ig and Id11+Id12 2Ig=−Ie1.

Figure 2:
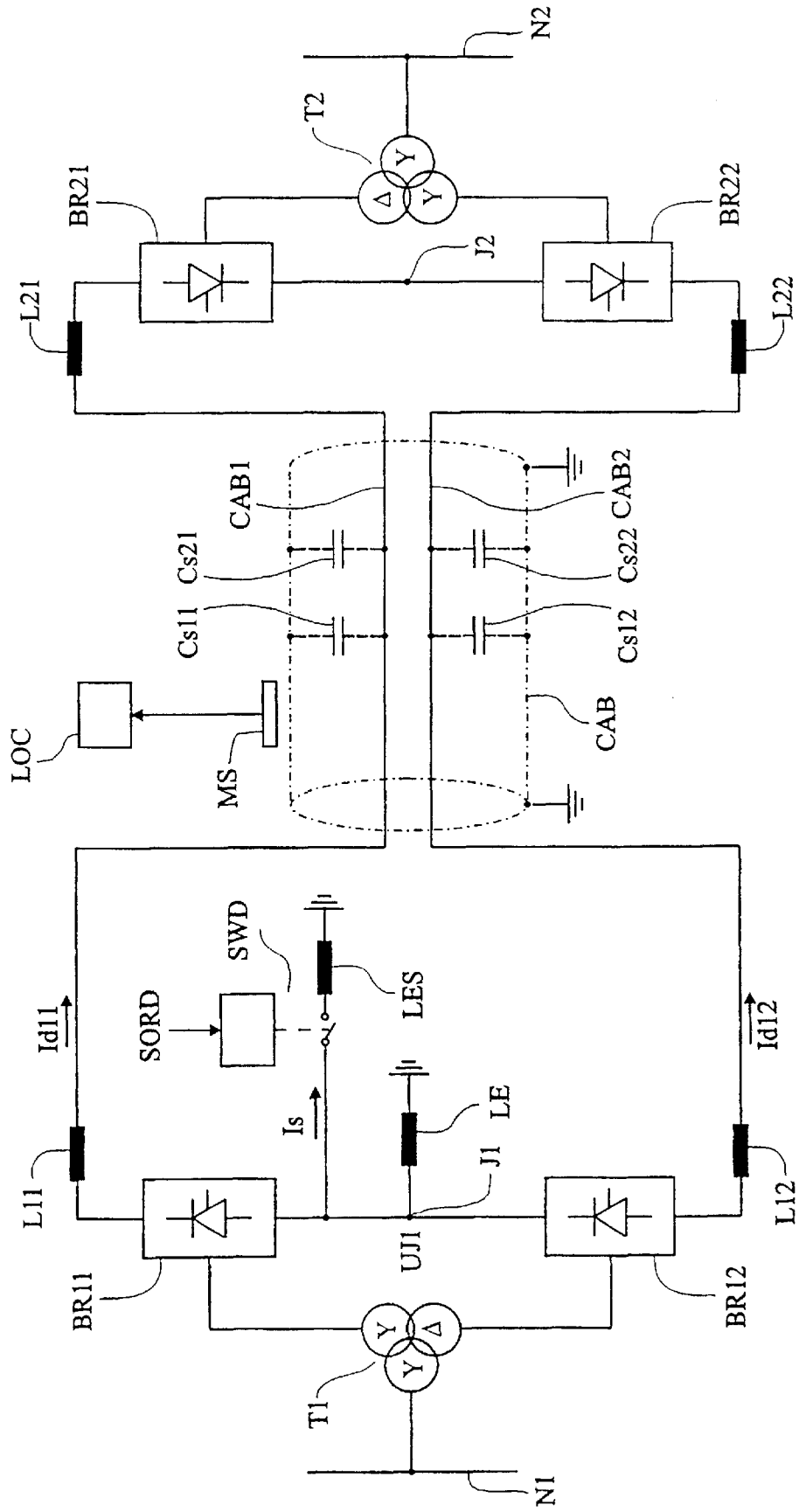
FIG. 2 shows an embodiment of the invention comprising means for influencing the inductance of an impedance circuit connected to ground, in a system according to FIG. 1.

FIG. 2 shows an embodiment of the invention in an energy transmission system of the kind described with reference to FIG. 1. Those parts of the transmission system which have been described with reference to FIG. 1 are shown in FIG. 2 with the same reference numerals.

The design of the double cable is usually such that the cables CAB1 and CAB2 exhibit capacitances towards the external screen surrounding the double cable, which screen is indicated in the figure as a dash-dotted cylinder. The screen is in electrically conducting contact with the surrounding soil/sand layer, in the figure symbolically marked by ground terminals at both ends of the screen. The capacitance of the cable CAB1 towards the screen, although of course distributed along the length of the screen, is illustrated in the figure by discrete capacitor symbols Cs11 and Cs21 and the capacitance of the cable CAB2 is similarly illustrated by capacitor symbols Cs12 and Cs22.

When a location of the cable is to be carried out, a location order SORD is given for supplying a ground-mode current to the dc connection. An inductor LES may, via a switching member SWD, in dependence on the above-mentioned location order, be connected between the connection point J1 and ground. The current which will thus flow through the inductor, in the figure designated Is, is an alternating current with a dominating component of a frequency equal to six times the mains frequency. As will be clear from the above, the dc connection is supplied with a ground-mode current which is equal to −Is/2 (as mentioned above, the current Ie1 through the inductor LE is negligible in this connection). This results in the formation of a magnetic field around the double cable, which field, at least in the vicinity of that end of the double cable which is connected to the smoothing inductors L11, L12, is substantially dependent on the sum of the currents Id11 and Id12, a sum current which according to the above is equal to Id11+Id12=2Ig−Is. However, the ground-mode current is successively dissipated through the capacitances to ground of the cables CAB1 and CAB2, whereby the sum current mentioned, and hence the sensable magnetic field, decrease with the distance from the connection point J1. The amplitude of the current Is is determined, besides by the voltage UJ1 at the connection point J1, by the inductance values for the inductor LES and the smoothing inductors L11 and L12 and by the capacitance of the cables, whereas the smoothing inductors L21 and L22 from a practical point of view prevent any part of the current Is from flowing through the valve bridges BR21, BR22. In a first approximation, the current Is is determined by the inductance values of the inductor LES and the smoothing inductors L11 and L12, in that the impedance associated with the capacitance of the double cable, at least in the case of long cables, may be omitted. A dimensioning of the inductor LES which leads to a deviation between the currents through the cables CAB1 and CAB2, which deviation is suitable for practical purposes and detectable by means of the sensor equipment, may thus be pre-calculated with knowledge of the other quantities mentioned. Typically, the circuits for the ground-mode current may be dimensioned such that the amplitude of the current Is, when location of the cable is to be carried out, amounts to the order of magnitude of 1 to 5% of the rated current of the installation, with the higher value for long cables. A typical value for the current Ie1 through the inductor LE is then of the order of magnitude of 0.1%.

Figure 3:
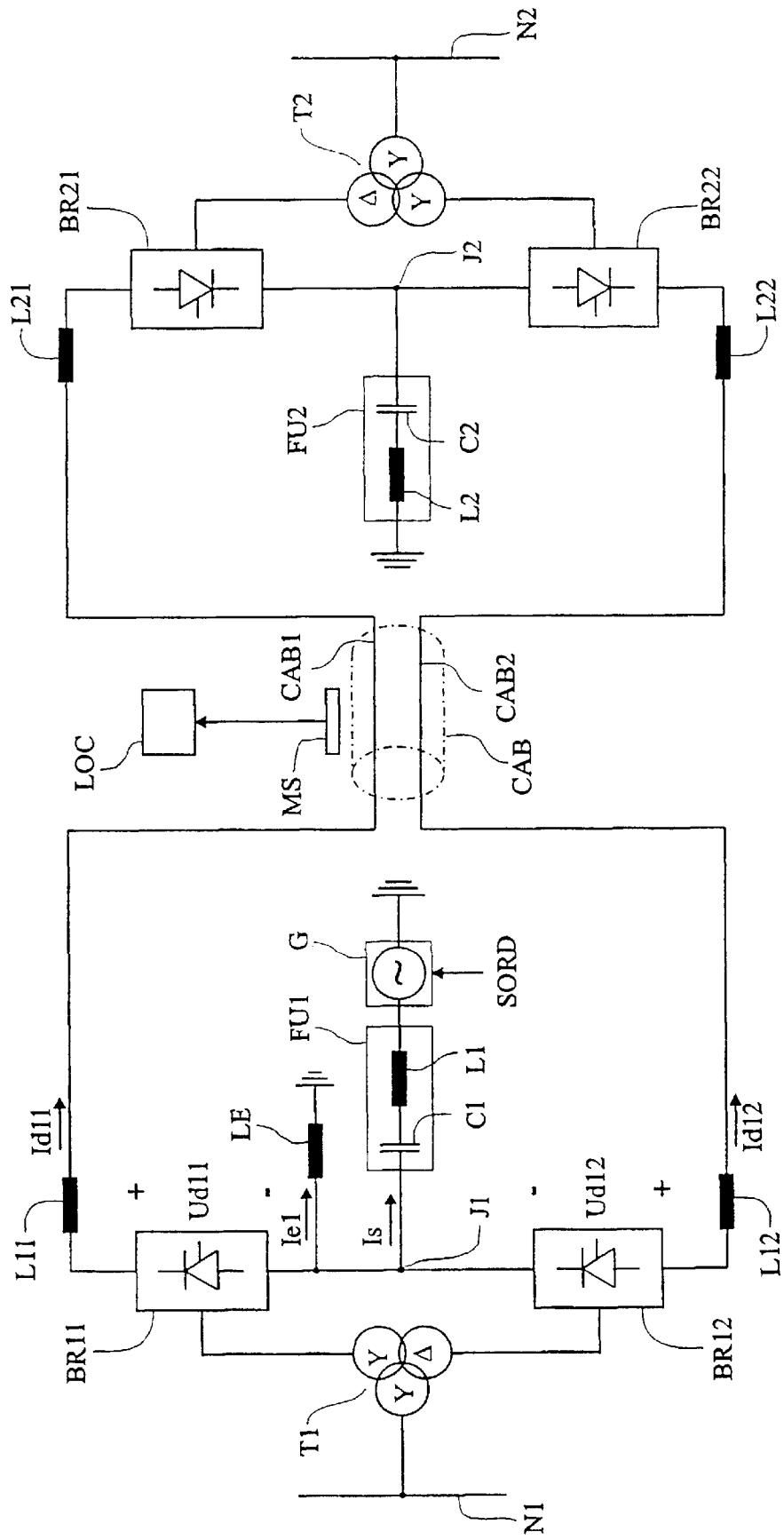
FIG. 3 shows an embodiment of the invention comprising a current source in a system according to FIG. 1.

FIG. 3 shows another embodiment of the invention in an energy transmission system of the kind described with reference to FIG. 1. Those parts of the transmission system which have been described with reference to FIG. 1 are illustrated in FIG. 3 with corresponding reference numerals.

Between the connection point J1 and ground, a current source in the form of a filter unit FU1, in series connection with a voltage generator G, is connected. The voltage generator, which is of a design known per se, is brought, in dependence on the location order, to generate a generator voltage with a chosen signal frequency. The signal frequency is suitably chosen such that it differs from six times the nominal mains frequency but advantageously constitutes an even multiple of the nominal mains frequency, for example twice or four times that frequency. The filter unit comprises a series connection of an inductor L1 and a capacitor C1, and the inductance value for the inductor and the capacitance value for the capacitor are then chosen such that the filter unit advantageously exhibits series resonance at the signal frequency, that is, has a pass band with a low impedance for this frequency. The filter unit is further dimensioned such that it exhibits a high impedance for a frequency equal to six times the nominal mains frequency. Between the connection point J2 and ground, a filter unit FU2 is connected, which filter unit comprises a series connection of an inductor L2 and a capacitor C2. The inductance value for the inductor LF2 and the capacitance value for the capacitor C2 are chosen such that the filter unit FU2 will have frequency properties similar to those of FU1. As is clear from the above-mentioned expressions and assumptions, and with definitions as illustrated in FIG. 1, the current Is generated by the current source is also equal to the sum of the current through the cable CAB1 and the current through the cable CAB2. The amplitude of the generator voltage is chosen such that the current Is is given an amplitude which, for practical purposes, may be detected by the detector equipment in a manner previously stated in the description. The voltage generator may, for example, comprise a tone generator and a power-amplification step with power transistors. Typically, the power requirement from the voltage generator may amount to 2.5 kV and 5 A at 100 Hz.

In this embodiment, the filter unit FU2 is included in the current path of the supplied ground-mode current. Especially in cables which are short and/or have a low capacitance and with a chosen low signal frequency, for example equal to twice the nominal mains frequency, the cable may be located along all of its length. Alternatively, of course, a voltage generator may be connected in series with the filter unit FU2. When applying a ground-mode current from this voltage generator, the voltage generator is bypassed at the filter unit FU1.

Figure 4:
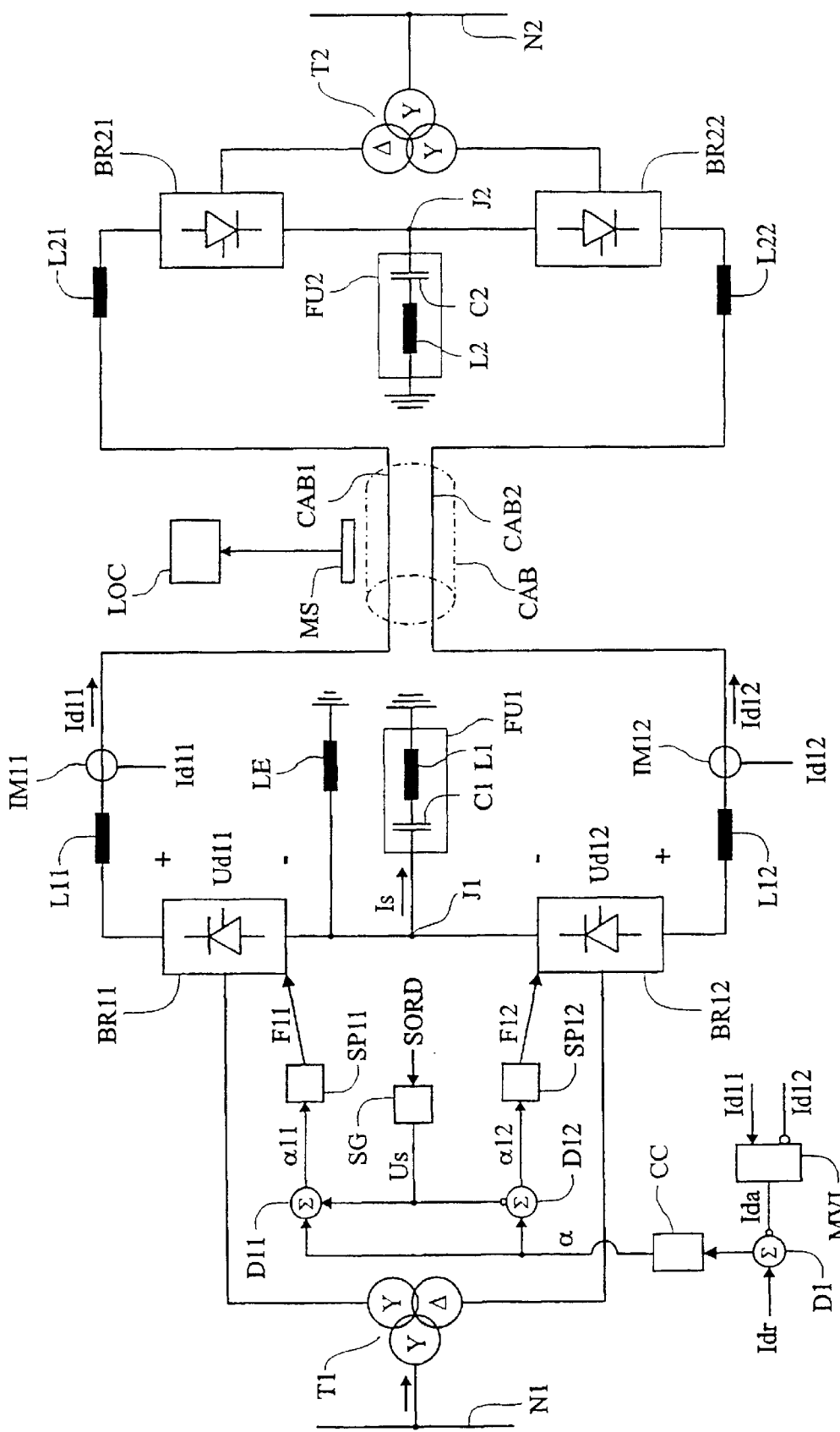
FIG. 4 shows an embodiment of the invention comprising means for influencing a control angle for a converter in a.system according to FIG. 1.

FIG. 4 shows another embodiment of the invention in an energy transmission system of the kind described with reference to FIG. 1. Those parts of the transmission system which have been described with reference to FIG. 1 are illustrated in FIG. 4 with corresponding reference numerals. In this embodiment, the ground-mode current intended for the location is generated by supplying a ground-mode current to the dc connection via the valve bridges BR11 and BR12. The figure schematically shows parts of a common piece of control equipment for the valve bridges. Control equipment comprises, in a known manner, a current controller CC, the output signal of which constitutes a control angle order α, common to both valve bridges, for phase-angle control of the bridges. A summator D1 is supplied with a reference value Idr, formed in some manner known per se, for the current through the dc connection and with an instantaneous value Ida for this current, and forms therefrom a difference which is supplied to the current controller (a ring at the symbol for the summator indicates that the input is a negating input). Control pulse devices SP11 and SP12 generate, in a known manner, in dependence on control-angle orders supplied thereto, firing signals F11 and F12, respectively, which are supplied to the valve bridges BR11 and BR12, respectively, for firing of semiconductor elements comprised therein, normally thyristors.

A signal generator SG generates, in dependence on the location order SORD, a signal voltage Us of a chosen signal frequency. This signal voltage and the control-angle order α are supplied to a summator D11 as well as to a summator D12, the signal voltage being supplied to a negating input of the summator D12. The output signal αll from the summator D11, which thus constitutes a sum of the control-angle order α and of the signal voltage Us, is supplied to the control-pulse device SP11, which, in dependence on this sum, generates the firing signals F11. The output signal α12 from the summator D12, which thus constitutes a difference of the control-angle order α and of the signal voltage Us, is supplied to the control-pulse device SP12, which, in dependence on this difference, generates the firing signals F12. It is realized from this that the converters are brought to generate a ground-mode voltage Ug of the chosen signal frequency, which in turn leads to ground-mode current being supplied to the dc transmission. The currents ID11 and Id12 are sensed by means of the current-measuring devices IM11 and IM12, respectively. To make possible location of the double cable during normal operation of the dc transmission, the measured values of the currents Id11 and Id12 (which measured values, in order not to burden the description with distinctions self-evident to the person skilled in the art, are similarly designated Id11 and Id12, respectively, in the figure) to a mean-value forming unit MVI (with the reference directions chosen, the measured value of the current Id12 is supplied to a negating input of the mean-value forming unit). The mean-value forming unit forms, in dependence on these measured value, an output signal Ida=(Id11−Id12)/2, which, as is clear from the above, corresponds to the pole-mode current Ip. The output signal Ida is supplied to the summator D1 as the instantaneous value for the current controller. The frequency of the signal voltage and the associated dimensioning of the filter units FU1 and FU2 may, for example, be chosen in a manner described above with reference to FIG. 3.

Figure 5:
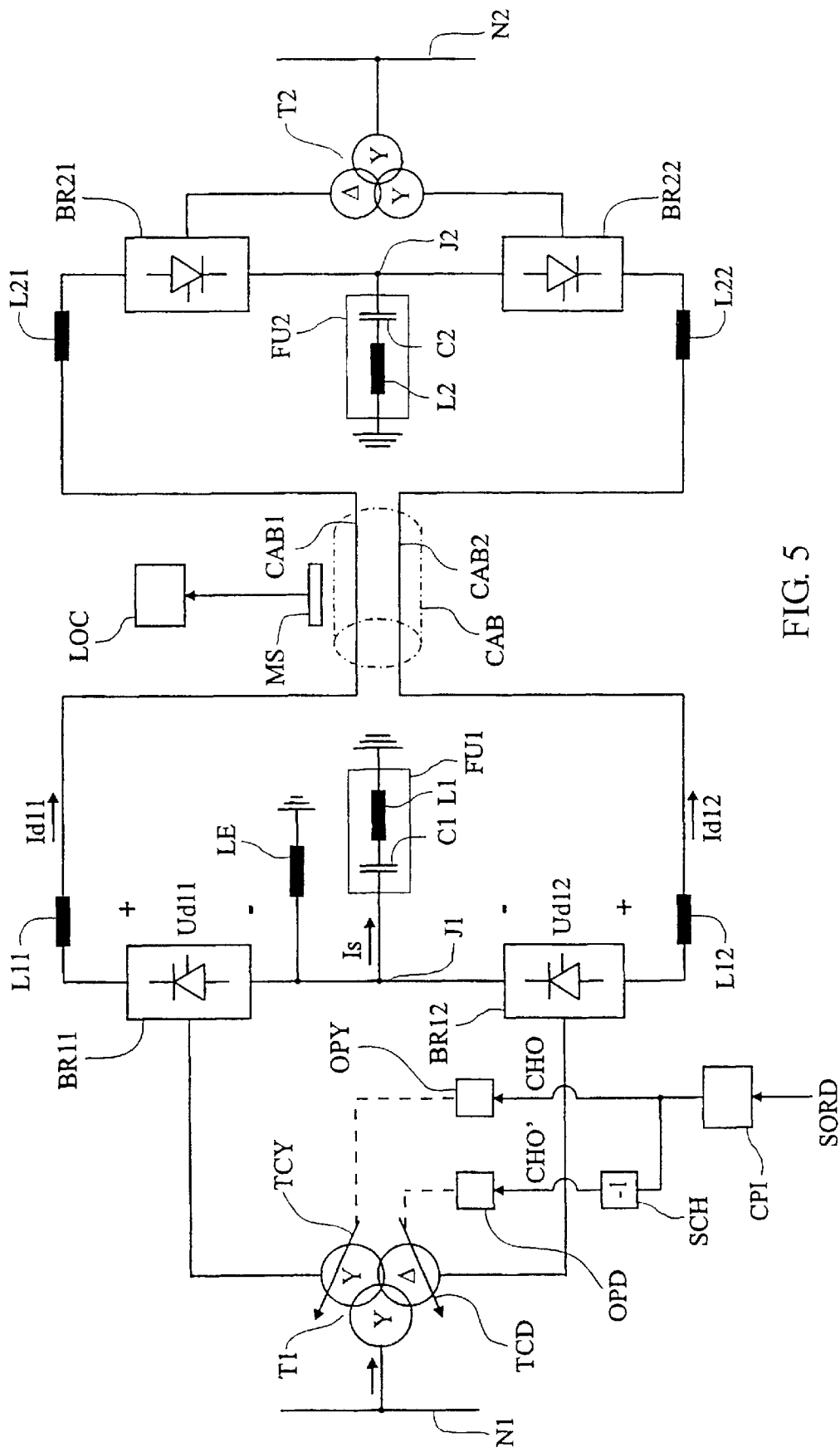
FIG. 5 shows an embodiment of the invention comprising means for influencing the switching position of a tap changer in a system according to FIG. 1.

FIG. 5 shows a further embodiment of the invention in which the ground-mode current intended for the location is generated by supplying a ground-mode voltage to the dc connection via the valve bridges BR11 and BR12. The energy transmission system is of the kind described with reference to FIG. 1 and those parts of the transmission system which have been described with reference to FIG. 1 are illustrated in FIG. 5 with the same reference numerals.

The secondary windings of the converter transformer T1 are each, in a manner known per se, provided with a tap changer. The tap changer of the star-connected secondary winding is schematically marked in the figure by an arrow TCY and the tap charger of the delta-connected secondary winding is marked by an arrow TCD. The positions of the tap changers may be adjusted individually via operating mechanisms OPY and OPD, respectively, which are arranged such that the switch position for each one of the phases of the three-phase ac network may be adjusted individually. This is easily done, for example, for those cases where the converter transformer in a known manner is designed as three separate single-phase units.

In this embodiment of the invention, an initiating unit CPI for changing the tap-changer position, in dependence on the location order SORD, generates a position-change order CHO, which is supplied to the operating mechanism OPY. The position-change order is also supplied to a sign-reversing unit SCH, which forms, as output signal, a position-change order CHO' signifying a position change in a direction opposite to that of the position-change order CHO. The position-change order CHO' is supplied to the operating mechanism OPD. The two position-change orders CHO and CHO' are then adapted, in some known manner, to influence only one and the same of the three phases U, V, W of the respective secondary windings, for example the U-phase. The location order SORD thus initiates, for example, a reduction of the position of the tap changer TCY for the U-phase by one step and hence at the same time an increase of the position of the tap changer TCD for the U-phase by one step. The result of this change of the switch positions is that the dc transmission is supplied with a ground-mode voltage of twice the nominal mains frequency, that is, at a 50 Hz ac network, a ground-mode voltage and a ground-mode current, associated therewith, of the frequency 100 Hz. The inductance values for the inductors L1 and L2, and the capacitance values of the capacitors C1 and C2 are then advantageously chosen such that the filter units FU1 and FU2 exhibit series resonance at a frequency equal to twice the nominal mains frequency, but exhibit a high impedance to a frequency equal to six times the nominal mains frequency.

In the embodiments of the invention which have been described above with reference to FIGS. 3–4, a signal frequency is preferably used which is lower than that which is given in an embodiment according to FIG. 2. In this way, also the circuits for the ground-mode current may be typically dimensioned for a lower unbalance current, typically such that the amplitude of the current Is in these embodiments amounts to the order of magnitude of 0.05 to 1% of the rated current of the installation.

The invention is not limited to the embodiments shown but a plurality of modifications are feasible for the invention defined by the claims.

Although described in detail only with reference to the embodiment according to FIG. 4, it is to be understood that the instantaneous value Ida of the current controller which is normally included in this kind of energy transmission system is formed in similar manner in all the embodiments of the invention.

The means shown in FIGS. 2–5 for supplying the dc connection with a ground-mode current and a ground-mode voltage, respectively, are arranged at the converter formed by the valve bridges BR11, BR12. These means may, of course, also be arranged at the converter formed by the valve bridges BR21, BR22, or at each one of the converters. In the latter case, the ground-mode current and the ground-mode voltage, respectively, may be supplied to the dc connection alternatively from the first or the second of the converters to locate, in particular, that part of the cable which is positioned closest to the respective converter. To avoid oscillation phenomena in the ground-mode current, however, ground-mode current should not be supplied to the dc transmission simultaneously from both converters.

To facilitate the location of the cable at that end of the double cable which is connected to the smoothing inductors L21, L22, in the embodiment of the invention described with reference to FIG. 2, an inductor which is connectable via a switching member may also be arranged for connection between the connection point J2 and ground, in dependence on the location order. To avoid the formation of a dc circuit through ground, it must thus be ensured that only one of the connection points J1 and J2 is simultaneously dc-connected to ground. This may, for example, be achieved by operating the switching members mentioned or by means of connection of a capacitor in series with the respective inductor.

As an alternative to connecting an inductor LES between the connection point J1 and ground, the inductor LE may be designed with switchable inductance, for example by being provided with end terminals 1 and 2 and a third terminal 3 arranged between the terminals 1 and 2. The switching member SWD may, in this embodiment, be arranged, in dependence on the location order SORD, to short-circuit that part of the inductor LE which is arranged between the terminals 2 and 3, resulting in its inductance being reduced. In the event that such a switchable inductor is arranged at both connection points, preferably only one of them should be simultaneously connected to ground.

Although the signal frequency for the ground-mode current and the ground-mode voltage, respectively, is exemplified as constituting an even multiple of the mains frequency, other signal frequencies may, of course, also be used. A limiting factor for the signal frequency is the capacitance to ground exhibited by the cable. Also signal frequencies considerably lower than the mains frequency, for example of the order of magnitude of 5 to 10 Hz, may in certain applications, particularly in the case of long cables, be advantageous.

In the above embodiments, the cables CAB1 and CAB2 have been described as being arranged in a double cable CAB, but the invention is, of course, also applicable also to those cases where these cables consist of two separate cables laid close to each other.

To sum up, the invention always offers a possibility of locating a cable of the kind mentioned at least in the vicinity of that converter where the ground-mode current and the ground-mode voltage, respectively, are supplied to the dc connection. In the embodiment described with reference to FIG. 2, that part of the cable which may be reliably located may be extended by increasing the amplitude of the supplied current Is. To locate the cable along the whole of its length, however, a ground-mode current should be supplied to each of the converters in the manner described above.

With the embodiments described with reference to FIGS. 3–5, with a filter unit FU1 connected to that converter where ground-mode current and ground-mode voltage, respectively, are supplied to the dc connection, a cable may also be located at least in the vicinity of this converter. An exception to this may be very short cables whose capacitance is so low that a ground-mode current of sufficient magnitude is not formed at the signal frequency in question. For this case and in order to locate a cable along the whole of its length, in any of the embodiments according to FIGS. 3–5, filter units FU1, FU2 are preferably arranged at both converters, as illustrated in FIGS. 3–5. In the case of very long cables, however, it may be preferable, also in these embodiments, to supply the dc connection with ground-mode current or ground-mode voltage at both converters, however, preferably only at one of them simultaneously.

What is claimed is:

1. A method for location of a cable in a dc connection in a bipolar 12-pulse system for transmission of electrical energy by means of high-voltage direct current, the dc connection interconnecting a first converter and a second converter, each converter having two 6-pulse valve bridges, connected in series at a respective connection point, wherein at least the connection point at the first converter is coupled to ground via a reactive impedance element, and the cable is located, by sensing of a magnetic field associated with a current flowing through the cable, wherein a ground-mode current, intended for the location, is supplied to the dc connection flowing through the connection point at the first converter, ground, and the valve bridges of the first converter, and a magnetic field associated with said ground-mode current is sensed.

2. A method according to claim 1, wherein at least the connection point at the first converter is connected to ground via an impedance circuit with an impedance of a substantially inductive character, and with means for influencing the impedance of the impedance circuit, and wherein said ground-mode current is supplied to the dc connection by at least temporarily reducing the inductance of the impedance circuit.

3. A method according to claim 1, further comprising a current source connected between the connection point at the first converter and ground and said ground-mode current is supplied to the dc connection by means of said current source.

4. A method according to claim 1, wherein the ground-mode current is supplied to the dc connection by bringing at least the first converter to generate a ground-mode voltage.

5. A method according to claim 4, wherein said ground-mode voltage is generated by influencing a control-angle order for at least one of the valve bridges.

6. A method according to claim 4, wherein the valve bridges are each connected to an ac network via respective secondary windings on a converter transformer, at least one of the secondary windings including a tap changer and wherein said ground-mode voltage is generated by influencing a switch position of the tap changer.

7. A method according to claim 3, the converters being connected to an ac network with a known nominal mains frequency, wherein the supplied ground-mode current has a given signal frequency which deviates from a frequency which is six times the mains frequency, and wherein at least the connection point at the first converter is connected to ground via a filter unit with a pass band for the signal frequency.

8. A method according to claim 7, wherein each one of the connection points is connected to ground via a separate filter unit with a pass band for the signal frequency.

9. A method according to claim 7, wherein the given signal frequency is chosen equal to twice the nominal mains frequency.

10. A device for location of a cable in a dc connection in a bipolar 12-pulse system for transmission of electrical energy by means of high-voltage direct current, the dc connection interconnecting a first converter and a second converter, each converter having two 6-pulse valve bridges connected in series at a respective connection point, wherein at least the connection point at the first converter is coupled to ground via a reactive impedance element, and the cable is located by sensing of a magnetic field associated with a current flowing through the cable, wherein the device comprises means for supplying a ground-mode current, intended for the location, to the dc connection, said means generating said ground-mode current to flow through the connection point at the first converter, ground, and the valve bridges of the first converter, whereby a magnetic field associated with said ground-mode current is sensed.

11. A device according to claim 10, wherein at least the connection point at the first converter is connected to ground via an impedance circuit with an impedance of a substantially inductive character, and wherein the device comprises means for influencing the impedance of the impedance circuit and said ground-mode current is supplied to the dc connection by at least temporarily reducing the inductance of the impedance circuit.

12. A device according to claim 10, further comprising a current source for connection between the connection point at the first converter and ground.

13. A device according to claim 10, further comprising means for generating a ground-mode voltage via at least the first converter.

14. A device according to claim 13, wherein the valve bridges generate dc voltages in dependence on a control-angle order generated by control equipment, and wherein the control equipment comprises means for generating said ground-mode voltage by influencing a control-angle order for at least one of the valve bridges.

15. A device according to claim 13, wherein the valve bridges are each connected to an ac network via respective secondary windings on a converter transformer, at least one of the secondary windings with a tap changer, and the device further comprising means for generating said ground-mode voltage by influencing a switch position of the tap changer.

16. A device according to claim 12, wherein the converters are connected to an ac network with a known nominal mains frequency, wherein the supplied ground-mode current has a given signal frequency which deviates from a frequency which is six times the mains frequency, and wherein the device for at least the connection point at the first converter comprises a filter unit with a pass band for the signal frequency and said connection point is connected to ground via said filter unit.

17. A device according to claim 16, wherein for each of the connection points, comprising a filter unit with a pass band for the signal frequency and the respective connection points are connected to ground via a respective one of said filter units.

18. A device according to claim 16, wherein said current source and said means for generating a ground-mode voltage via at least the first converter, respectively, generate a ground-mode current with a signal frequency which is equal to twice the nominal mains frequency.

* * * * *